United States Patent
Hintze et al.

[11] Patent Number: 5,839,856
[45] Date of Patent: Nov. 24, 1998

[54] BORING TOOL

[75] Inventors: Wolfgang Hintze, Essen; Günther Ruther, Marl, both of Germany

[73] Assignee: Widia GmbH, Essen, Germany

[21] Appl. No.: 847,691

[22] Filed: Apr. 28, 1997

Related U.S. Application Data

[63] Continuation-in-part of Ser. No. 549,690, filed as PCT/DE94/00561, May 10, 1994, published as WO94/29054, Dec. 22, 1994, abandoned.

[30] Foreign Application Priority Data

Jun. 3, 1993 [DE] Germany .......................... 43 18 479.0

[51] Int. Cl.⁶ .................................................. B23B 27/22
[52] U.S. Cl. ........................... 407/114; 407/115; 407/116
[58] Field of Search .................................. 407/2, 6, 113, 407/114, 115, 116

[56] References Cited

U.S. PATENT DOCUMENTS

| D. 306,032 | 2/1990 | Mihic | 407/116 X |
|---|---|---|---|
| 4,583,887 | 4/1986 | Wertheimer | 407/116 |
| 4,778,311 | 10/1988 | Niemi | 407/116 |
| 4,992,008 | 2/1991 | Pano | 407/115 X |
| 5,076,739 | 12/1991 | Pano | 407/114 X |
| 5,156,502 | 10/1992 | Satran | 407/113 X |

FOREIGN PATENT DOCUMENTS

| 245 225 | 11/1987 | European Pat. Off. . | |
|---|---|---|---|
| 307 563 | 3/1989 | European Pat. Off. . | |
| 0 310 239 | 4/1989 | European Pat. Off. . | |
| 0 416 900 | 3/1991 | European Pat. Off. . | |
| 0 507 250 | 10/1992 | European Pat. Off. . | |
| 0 534 450 | 3/1993 | European Pat. Off. . | |
| 1516240 | 10/1989 | U.S.S.R. | 407/116 |
| 91/08071 | 6/1991 | WIPO . | |

*Primary Examiner*—Andrea L. Pitts
*Assistant Examiner*—Henry W. H. Tsai
*Attorney, Agent, or Firm*—Herbert Dubno; Andrew Wilford

[57] ABSTRACT

A rotary boring tool has a body formed relative to a normal forward cutting direction with a main cutting edge extending transversely of the direction, a pair of side cutting edges extending backward in the direction from ends of the main cutting edge, a substantially planar front face extending substantially perpendicular to the direction from the main cutting edge, and a curved cutting face extending backward in the direction from the main cutting edge between the side edges. This curved face is formed in turn with a respective raised side crest at each side edge spaced backward in the direction from the main cutting edge, a depressed central region between the side crests and extending forward generally to the main cutting edge, a respective side flank between and merging smoothly with each of the crests and the central region and extending generally to the main cutting edge, and a twisted land extending along the main cutting edge between same and the crests, central region and side flanks, and forming with the front face an angle that decreases steadily from each side edge toward a center of the main cutting edge.

16 Claims, 3 Drawing Sheets

BORING TOOL

CROSS REFERENCE TO RELATED APPLICATION

This is a file-wrapper continuation-in-part of application Ser. No. 08/549,690 filed 2 Nov. 1995, now abandoned.

This application is the US national phase of PCT application PCT/DE94/00561 filed 10 May 1994 with a claim to the priority of German application P 43 18 479.0 itself filed 3 Jun. 1993.

FIELD OF THE INVENTION

The invention relates to a rotary boring tool, in particular a cutting body for releasable mounting in a holder, having at an end a main cutting edge and two side cutting edges, and a curved cutting face.

BACKGROUND OF THE INVENTION

Such a cutting insert having at a right angle to the main cutting edge in regions remote from the main cutting edge relative to the main cutting plane a climbing region which has at the side flanks crests relative to the central region is known from EP 0,416,900. In general cutting inserts are intended to shape and stiffen the passing chip so that it can easily break in the regions remote from the cutting edge so that they can be conducted away without the danger of damaging the workpiece or the cutting insert. If possible the creation, shaping, and movement of the chip should take place without friction in order to minimize wear of the cutting face or of the chip-forming element on the cutting insert. The friction should in connection therewith be as little as possible since it leads to heating of the cutting insert. In order to optimize, the cutting insert according to EP 0,416,900 has at one end a main cutting edge which extends concavely and is formed axially symmetrically to the longitudinal axis of the tool. The main cutting edge has a recessed center region. The cutting face has at the edge regions respective shovel-shaped rising flanks which widen in the chip-travel direction and merge as steps into a second region with laterally inclined flanks and end in points. The described tool lifts the chip and stiffens it by lateral compression.

WO 91/08071 describes a rotary boring tool where the free face of the boring cutter includes, in order to form an attack angle in the plane of the cutting face of the cutter blade an angle with the tool central longitudinal axis running in the boring advance direction. The boring cutter has between its end regions on both sides a recessed central region with a central cutting region generally parallel to both end-region cutters. The connection blades between the end region blade and the central region blade form a flank angle closing toward the cutter body, the connecting blade turned toward the end region preceding in the boring advance direction forming an angle with the end-region cutter that is bigger than the counter angle between the other connecting blade and the end region blade trailing in the boring-advance direction. This ensures that the extrusion pressure resulting from the attack angle of the boring cutter is compensated for while chip formation is improved for a lighter and surer conduction away of the chip.

U.S. Pat. No. 4,776,733 describes a cutting tool with a recessed central blade part that is shaped concave. The free face has a projection that is convexly curved and that extends symmetrically to both sides to a free-surface longitudinal central axis. The cutting face itself has to both sides at the edges relative to the central recessed cutting recess flank regions that should lead to chip guiding. The lateral guide flanks are however only limitedly able to stably guide the passing chip.

OBJECT OF THE INVENTION

It is therefore an object of the present invention to provide a rotary boring tool that has a cutting face geometry with improved chip guiding and that further stabilizes in particular the cutting corners and raises the maximum deformation.

SUMMARY OF THE INVENTION

These objects are attained according to the invention in a rotary boring tool having a body formed relative to a normal forward cutting direction with a main cutting edge extending transversely of the direction, a pair of side cutting edges extending backward in the direction from ends of the main cutting edge, a substantially planar front face extending substantially perpendicular to the direction from the main cutting edge, and a curved cutting face extending backward in the direction from the main cutting edge between the side edges. The curved cutting face is formed with a respective raised side crest at each side edge spaced backward in the direction from the main cutting edge, a depressed central region between the side crests and extending forward generally to the main cutting edge, a respective side flank between and merging smoothly with each of the crests and the central region and extending generally to the main cutting edge, and a twisted land extending along the main cutting edge between same and the crests, central region and side flanks, and forming with the front face an angle that decreases steadily from each side edge toward a center of the main cutting edge.

As a result of the twisted land at the main cutting edge and having a face angle that increases from the each of the lateral corners toward the center, one gets an improved stiffening of the passing chip. The lateral crests additionally provide a lateral guiding for the passing chip.

Preferably the cutting-face cross-sectional shape in the chip-travel direction is constant over a first region near the cutting edge and/or over a second chip-travel region lying in the ascending region, but it can also change in other regions.

According to another embodiment of the invention the cross-sectional shape runs mirror symmetrical to a perpendicular from the center of the main cutting edge (tool longitudinal axis) The cutting face merges in the chip-travel direction finally into a chip forming step which has a recessed central part and higher regions in the outer edges.

If the compression of the chip is to be increased, the flanks descending laterally to the recessed middle are inclined inward to each other perpendicular to the main cutting edge to taper the middle region. The taper amounts to at bore widths between 2 mm and 12 mm between 0.3 mm and 3 mm or 5% to 25% of the bore width (L). The tapered region starts at a spacing from the main cutting edge of from 0 mm to 4 mm or up to 30% of the bore width (L) and/or extends over a minimal length from 0.3 mm to 5 mm or 10% to 40% of the bore width (L).

According to a further embodiment of the invention the main cutting edge extends straight, slightly concavely, slightly concavely with a recessed center region, or with convex curvatures in the region of the cutting corners and concave curvatures in or near the center region.

The cutting face ascends in the chip-travel direction at least in regions remote from the cutting edge uniformly. In these regions according to a concrete embodiment of the invention the cutting face does not vary in the chip-travel direction relative to its cross-sectional shape, which is constant. In this manner one gets an ideal chip guiding over the entire chip-travel path so that the passing chip is guided until it is broken by the rotary boring tool. The cutting face ascends at first at the edges seen perpendicular to the main cutting edge, then runs through a valley, and ascends again to a chip-forming step. Correspondingly the cutting surface preferably descends in the region at first continuously (i.e. the face angle is positive), reaches a valley, and then again rises. Thus at least a part of the descending flank of the cutting face runs perpendicular to the main cutting edge.

Furthermore the face angle in particular increases continuously from the cutting corners to the middle of the cutting edge. This avoids sharp transitions and simultaneously throws the chip uniformly off relative to the cutting edge center. Preferably the increase is between 2° and 20° over 1/10 to 1/2 of the bore width (main cutting edge length). The face angle can be between −30° and +20° at the lateral corners so that from one corner, i.e. the junction of a side cutting edge to the main cutting edge to the main-cutting edge center the face angle can be changed from negative to absolutely smaller negative values or from negative to positive angles or from positive angles to stronger positive angles. Preferably the twist is such that the face angle is changed from the corner to the center of the cutting edge from a negative value to a positive value.

According to a further preferred embodiment the increase is 8° to 18° over 1/10 to 1/5 of the bore width.

According to a further embodiment of the invention the face angles at the same spacing to opposite sides of the center of the cutting edge have different values, that is the tool is asymmetrical relative to a perpendicular from the cutting edge. Preferably the difference of the values of the face angles is between 1° and 10°, in particular between 3° and 6°. Preferably this formation is used with attack angles of the boring edge not equal to 90°.

BRIEF DESCRIPTION OF THE DRAWINGS

An embodiment of the invention is shown in the drawing. Therein.

SPECIFIC DESCRIPTION

Figure 1:
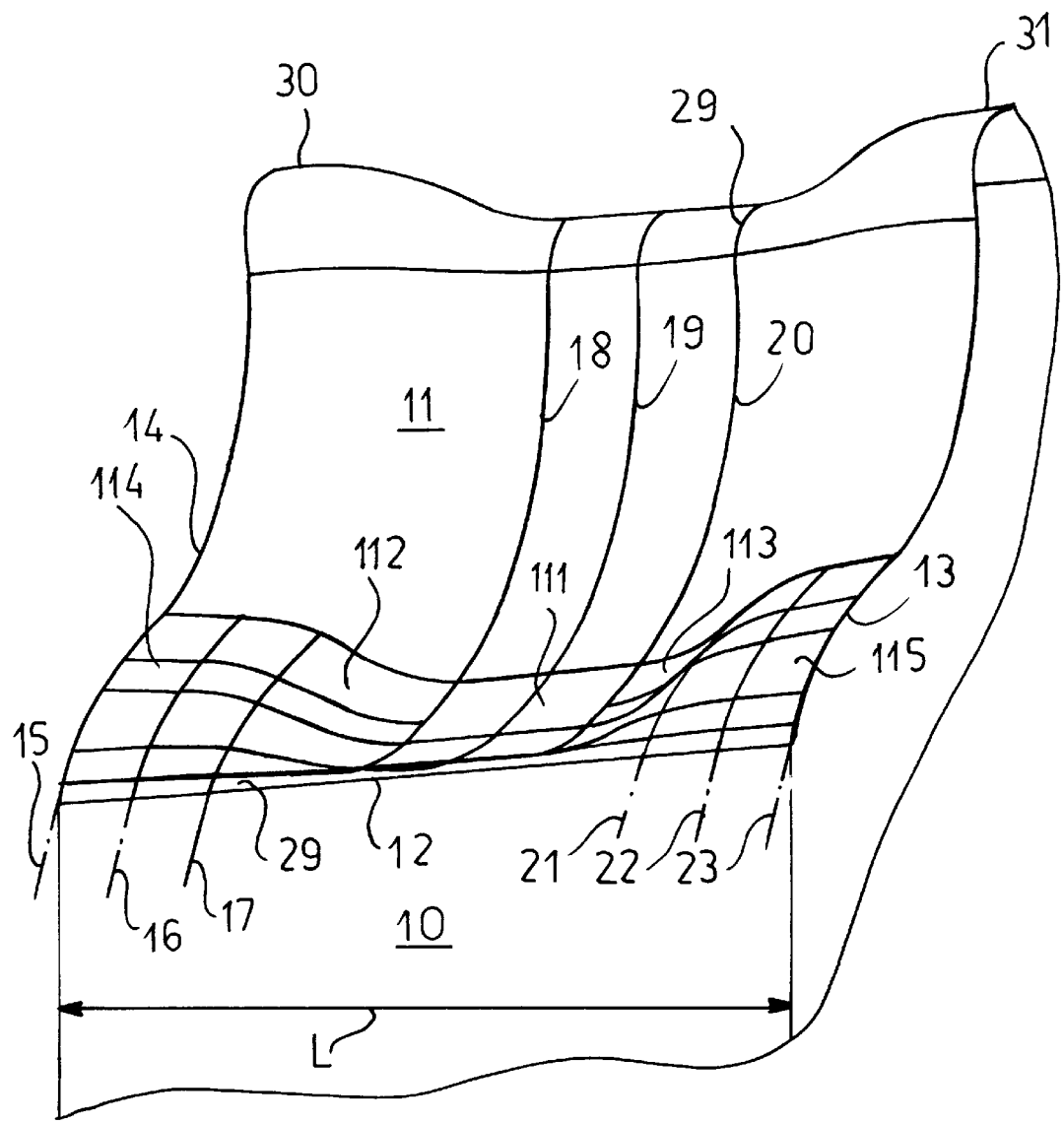
FIG. 1 is a perspective view of a rotary boring tool according to the invention.
Figure 2:
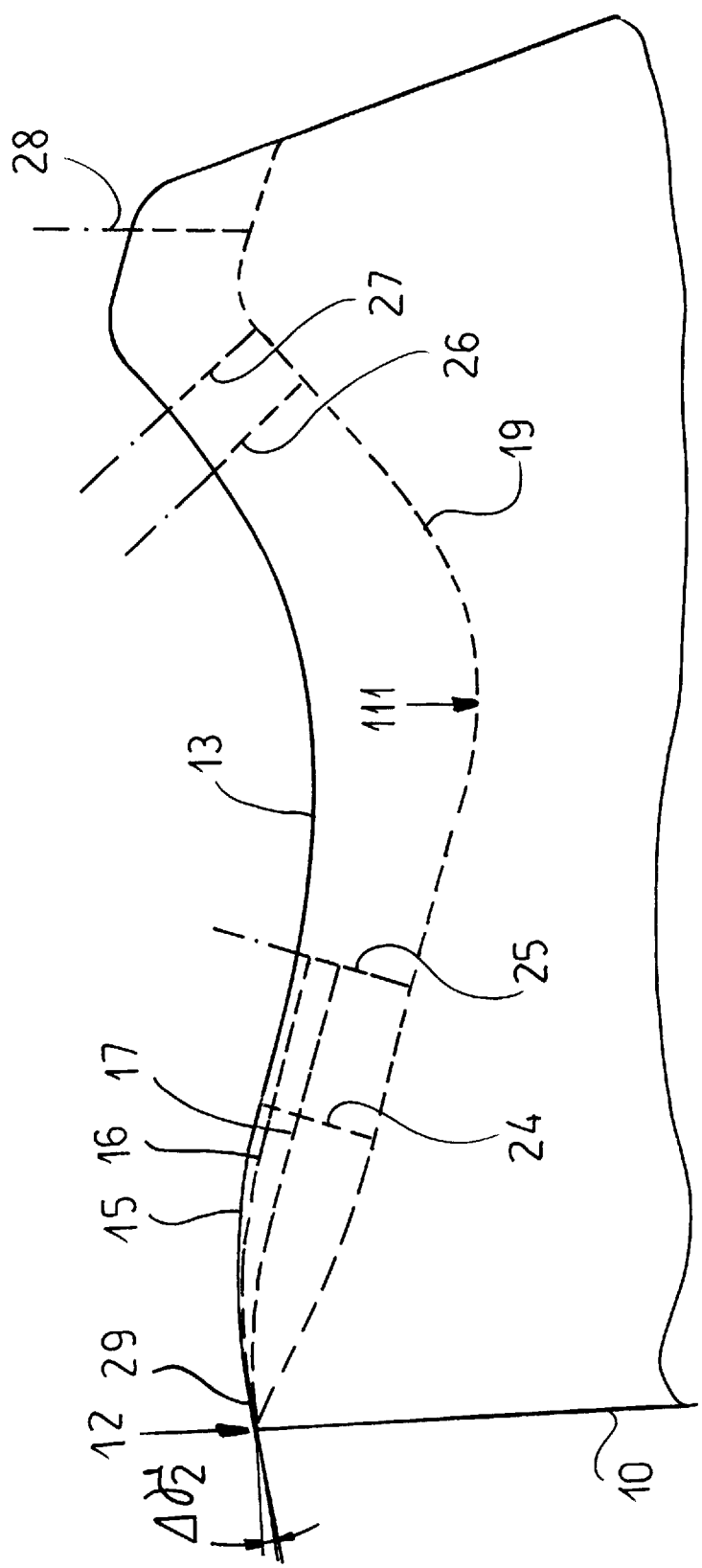
FIG. 2 is a side view of the rotary boring tool according to FIG. 1.

The illustrated rotary boring tool has at its end a cutting edge 12 delimiting a free face 10 and a cutting face 11 as well as side cutting edges 13 and 14 which extend generally at a right angle to the main cutting edge 12. The cutting face 11 ends at a negative face angle at the cutting edge 12 in edge regions (see lines 15 and 23). The face angle increases continuously toward the lines 16 and 17 as shown by values $\Delta_{\gamma 1}$ and $\Delta_{\gamma 2}$ (see FIG. 2). The increase is equal to 2° to 20° over 1/10 to half of the overall length L of the main cutting edge. In the central region, that is in the region of the lines 18, 19, and 20, the face angle is positive at the cutting edge. The lines 21, 22, and 23 correspond to the respective lines 17, 16, and 15.

Alternatively, the cutting insert can also be formed asymmetrically such that the face angle of the lines 15 and 23 can be different like the lines 16 and 22 or 17 and 21.

The cutting face 11 has a central recess 111 which lies below the plane defined by the cutting edge 12 and which goes up to both sides at flanks 112 and 113 to crests at the edges. Starting roughly from the plane 24 extending parallel to the cutting edge 12 to the plane 25 and from the plane 26 to the plane 27 the cutting-surface cross section does not change. This means that in these regions the side crests remain the same. These crests serve as chip guiders, the spacing between the lateral flanks 112 and 113 at least does not change although a decrease, that is a central part of decreasing width, is permissible.

Figure 3:
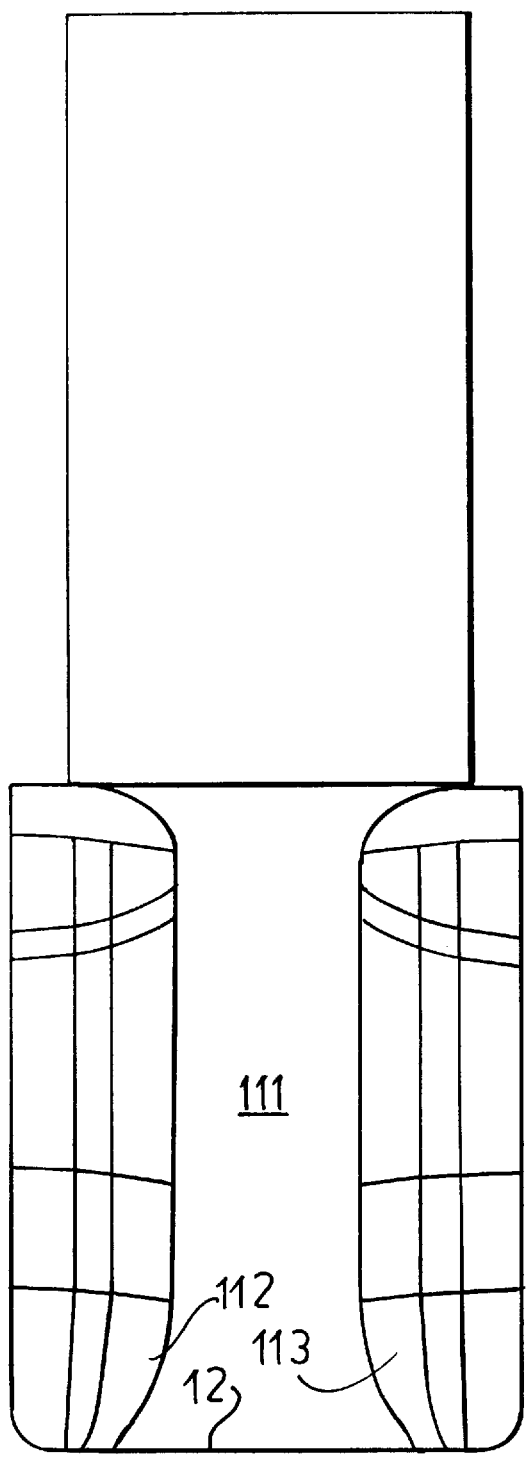
FIG. 3 is a top view of a further embodiment of a boring insert.

FIG. 3 shows a restriction of the central region or of the converging flanks 112 and 113 extending right up to the cutting edge.

In addition to the illustrated embodiments, variously formed side regions with different flank widths, angles, and cutting-surface elevations are possible, even formed as chip-forming elements with longitudinal ridges.

What is claimed is:

1. A rotary boring tool having a body formed with:
    a main cutting edge extending transversely of the direction;
    a pair of side cutting edges extending backward in the direction from ends of the main cutting edge;
    a substantially planar front face extending substantially perpendicular to the direction from the main cutting edge; and
    a curved cutting face extending backward in the direction from the main cutting edge between the side cutting edges and formed in turn with
        a respective raised side crest at each side edge spaced backward in the direction from the main cutting edge,
        a depressed central region between the side crests and extending forward generally to the main cutting edge,
        a respective side flank between the crests, merging smoothly with each of the crests and with the central region, and extending generally to the main cutting edge, and
        a twisted land extending along the main cutting edge between same and the crests, central region and side flanks, and forming with, the front face a face angle that has an apex at the cutting edge and that increases steadily from each side edge toward a center of the main cutting edge.

2. The rotary boring tool according to claim 1 wherein the curved cutting face is symmetrical to a perpendicular to the center of the main cutting edge.

3. The rotary boring tool according to claim 1 wherein the cutting face merges in a chip-travel direction into a chip-shaping step which has a recessed central part and relative thereto higher edge regions.

4. The rotary boring tool according to claim 1 wherein the side flanks descend laterally relative to the depressed central region of the cutting face and converge relative to one another in a chip-travel direction and narrow the central region.

5. The rotary boring tool according to claim 4 wherein with bore widths between 2 mm and 12 mm the central region is narrowed by the side flanks by between 0.3 mm and 3 mm.

6. The rotary boring tool according to claim 5 wherein the narrowed central region starts at a spacing from the main cutting edge of from 0 mm to 4 mm and extends over a minimal length from 0.3 mm to 5 mm.

7. The rotary boring tool according to claim 1 wherein the main cutting edge extends straight and slightly concavely with a recessed center region, or with convex curvatures in the region of the side edges and concave curvatures near the center region.

8. The rotary boring tool according to claim 1 wherein the cutting face rises smoothly in a chip travel region at least in regions offset from the main cutting edge.

9. The rotary boring tool according to claim 1 wherein the cutting face at first rises at the side edges, then runs through a valley, and finally again climbs to a chip-forming step.

10. The rotary boring tool according to claim 1 wherein the cutting face seen perpendicular to the main cutting edge in the central region at first descends continuously, then runs through a valley, and finally again climbs to a chip-forming step.

11. The rotary boring tool according to claim 10 wherein at least a part of the descending flank of the cutting face extends in a straight line seen in a chip-travel direction.

12. The rotary boring tool according to claim 1 wherein the increase of the face angle is between 2° and 20° over $\frac{1}{10}$ to $\frac{1}{2}$ of the bore width.

13. The rotary boring tool according to claim 12 wherein the face angle lies at the side edges between −30° and +20°.

14. The rotary boring tool according to claim 1 wherein the face angle changes from the side flanks to the cutting-edge center from a negative value to a positive value.

15. The rotary boring tool according to claim 1 wherein face angles lying at the same distance from the center of the main cutting edge to opposite sides have different values.

16. The rotary boring tool according to claim 15 wherein the difference of the values is between 1° and 10° when used with attack angles of the boring cutter not equal to 90°.

* * * * *